US00RE39826E

(19) United States
(12) Reissued Patent
Lu

(10) Patent Number: US RE39,826 E
(45) Date of Reissued Patent: Sep. 11, 2007

(54) COMPREHENSIVE NATURAL GAS PROCESSING

(76) Inventor: Yingzhong Lu, 104 Harland Ct., Oak Ridge, TN (US) 37830

(21) Appl. No.: 11/038,003

(22) Filed: Jan. 19, 2005

Related U.S. Patent Documents

Reissue of:
(64) Patent No.: 6,553,784
Issued: Apr. 29, 2003
Appl. No.: 09/683,946
Filed: Mar. 6, 2002

(30) Foreign Application Priority Data

Aug. 23, 2001 (CN) ..... 01 1 24271

(51) Int. Cl.
*F25J 3/00* (2006.01)

(52) U.S. Cl. ..... 62/632; 62/633
(58) Field of Classification Search ..... 62/632, 62/635, 636, 620, 622, 625, 633
See application file for complete search history.

(56) References Cited

U.S. PATENT DOCUMENTS 3,837,143 A * 9/1974 Sutherland et al. ..... 95/162
4,421,535 A * 12/1983 Mehra ..... 62/625
4,511,381 A * 4/1985 Mehra ..... 62/625
5,104,630 A * 4/1992 Holmes et al. ..... 423/243.11
5,685,170 A * 11/1997 Sorensen ..... 62/625
5,685,171 A * 11/1997 Foerster ..... 62/633
5,687,584 A * 11/1997 Mehra ..... 62/632
5,797,981 A * 8/1998 Collin et al. ..... 95/174
5,868,004 A * 2/1999 Rojey et al. ..... 62/625
6,016,667 A * 1/2000 Doerler et al. ..... 62/625

* cited by examiner

*Primary Examiner*—William C. Doerrler

(57) ABSTRACT

The present invention related to *a process and* an apparatus for efficient and cost-effective comprehensive processing of natural gas, including the removal of moisture and the recovery of the higher hydrocarbons components ($C_2^+$). The said apparatus comprises the following major components: an integrated natural gas processor with a dehydration section and a higher hydrocarbons absorption section; a heat transport medium cooler; an absorbent cooler; a fractional distiller for separating the light oil from the heavy oil absorbent; an inhibitor regenerator; and a refrigeration unit. The present invention provides a low-cost natural gas comprehensive [processor] *processing* that is universally applicable to both terrestrial and off-shore natural gas exploitation. The said apparatus also provides an efficient and cost-effective natural gas dehydrator when the dehydration section is used independently without incorporating the absorption section.

12 Claims, 3 Drawing Sheets

COMPREHENSIVE NATURAL GAS PROCESSING

Matter enclosed in heavy brackets [ ] appears in the original patent but forms no part of this reissue specification; matter printed in italics indicates the additions made by reissue.

BACKGROUND OF INVENTION

The reduction of $CO_2$ emission is one of the greatest concerns in combating the catastrophic "global warming" trend. As a result, the world puts much emphasis on the exploitation of "clean energy" with less or non-emission for both industrial and domestic uses. Natural gas (hereafter abbreviated as "NG"), as compared with coal and petroleum, is considered the most economic "clean" fuel that is used on a large, industrial scale at present and in the near future. In addition, the discovery of huge amount of ocean-bed gas-hydrates increases the recoverable resources of NG substantially. It is expected that, in the long run, the global NG consumption may eventually exceeds all other fossil fuels.

NG is a mixture of hydrocarbon gases, consisting of mainly methane ($C_1$) and a smaller fraction of heavier gaseous hydrocarbons (i.e., ethane, $C_2$; propane, $C_3$; butane, $C_4$; pentane and higher, $C_5^+$; sometimes $C_3$+ is called "light oil" as a whole. However, the economic values of these higher hydrocarbon components, when separated and sold as chemical feedstock, are usually much higher than burnt as a fuel. A number of NG processing plants, therefore, have been constructed to extract these valuable materials.

The state-of-the-art NG processing plants generally work on a cryogenic process for efficiently separating the higher hydrocarbon gases In this process, a huge volume of NG is cooled down by expansion to a very low cryogenic temperature around −150° F. Such a process is extremely energy-consuming, and the facility usually comprises many pieces of expensive equipment, notably the molecular-sieve dehydrator, the multiple-flow finned-plate heat exchanger, and the turbo expander-compressor. High capital and operational costs are thus resulted. As a consequence, only a limited fraction of the NG could be processed before consumed as a fuel. Most of the valuable higher hydrocarbon contents was improperly used.

In the past two decades, a number of US patents have been granted in this field, for example, the 13 US patents entitled "hydrocarbon Processing" presented by late Roy E. Campbell, et al., i.e., U.S. Pat. Nos. 4,140,504; 4,157,904; 4,171,964; 4,278,457; 4,854,955; 4,869,740; 4,889,545; 5,555,784; 5,568,737; 5,771,712; 5,881,569; 5,983,664; and 6,182,469. However, most of these patents only proposed some specific improvements to the same cryogenic process. No substantial break-through in NG processing technology has ever been proposed. A more efficient and cost-effective technology for NG procession, therefore, is desirable.

The recent developments in NG refrigeration dehydration technology, e.g., those presented in U.S. Pat. No. 5,664,426, "Regenerative Gas Dehydrator," 1997, and U.S. Pat. No. 6,158,242, "Gas Dehydration Method and Apparatus," 2000, provided the basis of a break-through in the NG processing technology. These patents make possible to perform refrigeration dehydration and refrigeration absorption in a single unit.

Accordingly, it is an objective of the present invention to provide a comprehensive NG *process and a* processor, based on the refrigeration dehydration and absorption technologies, for efficient and cost-effective comprehensive processing of NG. The said processor could simultaneously perform the removal of moisture and the recovery of the higher hydrocarbons ($C_2^+$) in a single piece of equipment, thus substantially reducing the capital and operational costs of the NG processing plant.

Another objective of the present invention is to provide an energy-saving comprehensive NG *process and a* processor that, when processing high pressure NG, does not need external energy for refrigeration.

A further objective of the present invention is to provide a high-efficiency free-piston expander-compressor to provide the required refrigeration.

SUMMARY OF INVENTION

With regard to the above and other objectives, the present invention provides a comprehensive NG *process and a* processor to simultaneously perform refrigeration dehydration and refrigeration absorption of higher hydrocarbon gases with maximum recovery rate at minimum energy consumption. The final product is a gaseous mixture enriched in higher hydrocarbons with minimum residual methane.

The said apparatus comprises the following major components: an integrated NG processor (hereafter abbreviated as "processor) with a refrigeration dehydration section (hereafter abbreviated as "dehydrator") and a refrigeration absorption section (hereafter abbreviated as "absorber"); a heat-transport medium (hereafter abbreviated as "medium") cooler; an absorbent cooler; a fractional distiller; a gas-hydrate inhibitor (hereafter abbreviated as "inhibitor") regenerator; and a refrigeration unit.

The principle of the operations of the comprehensive NG processor follows. The inlet moisture-laden NG, flowing upward from the bottom of the dehydrator, is cooled down to the desired dewpoint temperature by directly contacting a down-flowing, adequately dispersed low-temperature medium stream. The medium is an aqueous solution containing an inhibitor. The moisture in the inlet NG is condensed on the surface of the medium droplets. The medium, diluted with the condensates, is re-concentrated in an inhibitor regenerator and recycled. The dehydrated NG continues to flow upward into the absorber wherein the higher hydrocarbon gases are absorbed with a down-flowing, adequately dispersed low-temperature absorbent (e.g., heavy oil) stream. The light oil-laden absorbent (hereafter abbreviated as "rich oil") then enters the fractional distiller wherein the absorbed higher hydrocarbons is separated as the final product. The recovered absorbent is cooled in the absorbent cooler and recycled to the absorber of the processor. The processed NG, basically free from higher hydrocarbons (hereafter abbreviated as "lean NG"), is re-heated and eventually delivered to the NG transportation pipeline. The refrigeration unit provides the required refrigeration for both medium cooler and absorbed cooler.

When the pressure of the inlet NG is sufficiently high, the required refrigeration could be provided with expanding the dehydrated high pressure NG. In such a "self-refrigeration" case, no external energy is required.

In case of the pressure difference between the inlet NG and the NG transportation pipeline is small, a high-efficiency free-piston NG expander-compressor is proposed in the present invention to provide the required self-refrigeration.

BRIEF DESCRIPTION OF DRAWINGS

The above and other features and advantages of the present invention will now be further described in the following detailed description section in conjunction with the attached drawings in which.

DETAILED DESCRIPTION

Figure 1:
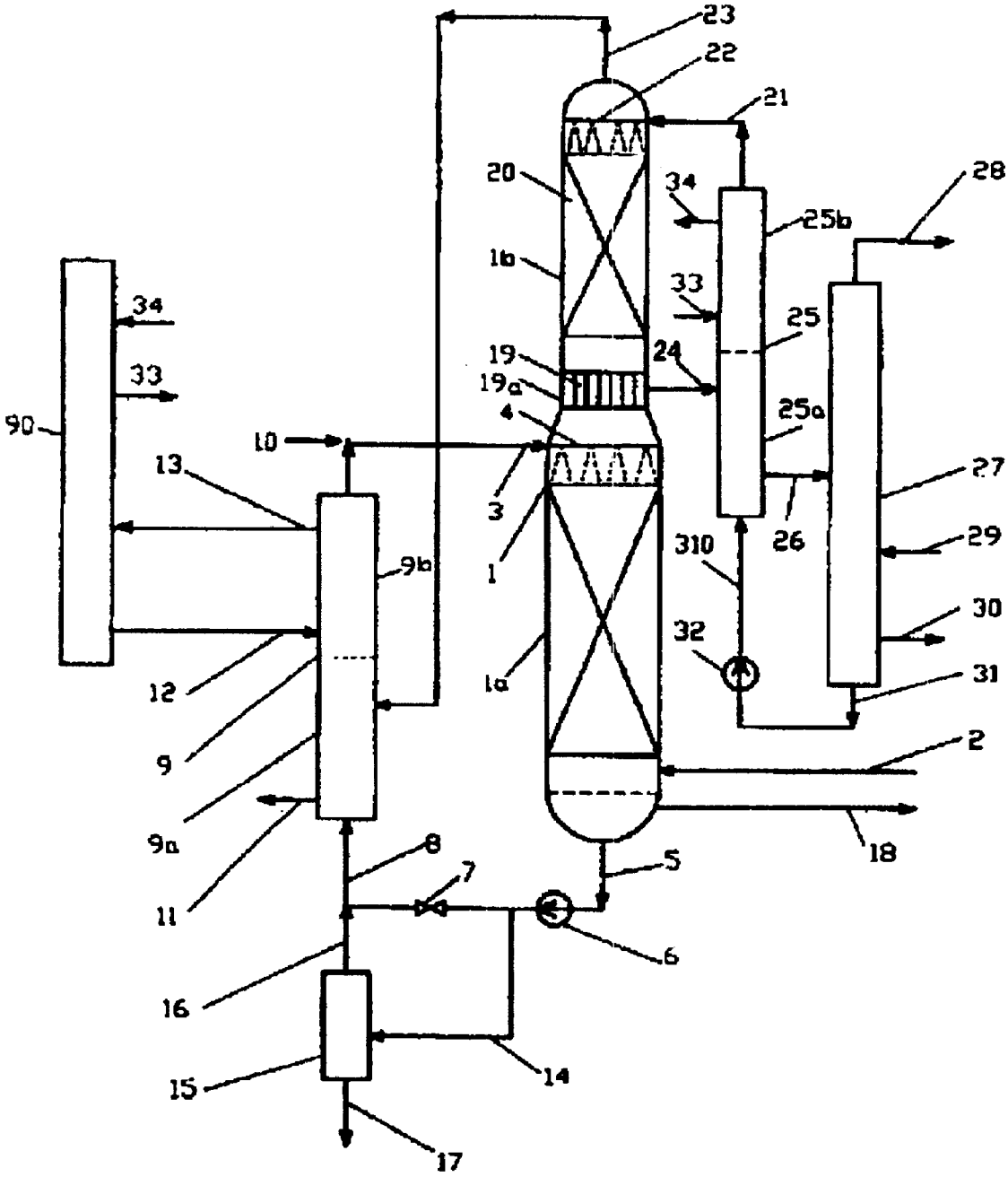
FIG. 1 illustrates one preferred embodiment of the comprehensive NG [processor] *processing* of the present invention wherein a separate industrial refrigeration unit is used to provide the required refrigeration.

FIG. 1 illustrates one preferred embodiment of the comprehensive NG [processor] *processing* of the present invention wherein a separate industrial refrigeration unit is used to provide the required refrigeration.

The said apparatus comprises the following major components: a processor 1 comprising a dehydrator 1a and an absorber 1b; a medium cooler 9 comprising a pre-cooler 9a and a deep-cooler 9b; an absorbent cooler 25 comprising a pre-cooler 25a and a deep-cooler 25b; a fractional distiller 27; an inhibitor regenerator 15, and a refrigeration unit 90.

The inlet NG, laden with moisture and all the higher hydrocarbon components, i.e., $C_2$, $C_3$, $C_4$, and $C_5^+$, enters the dehydrator 1a from the bottom via the raw NG inlet pipeline 2 and flows upward.

A low-temperature medium, containing an inhibitor, enters from the top of the dehydrator via the medium inlet pipeline 3. The medium is distributed or dispersed with the medium distributor 4 over the whole cross-section of the dehydrator and flows downward.

The medium is an aqueous solution of an inhibitor, such as an ionic salt or an organic compound. The concentration of the said inhibitor should be sufficient high to prevent the formation of gas-hydrates/ice over the entire temperature range of the dehydrator operations.

The medium is either sprayed as finely divided droplets or is dispersed with a packed column to provide extensive contacting surfaces for cooling the up-flowing NG. The moisture in the NG condenses on the dispersed medium surfaces and dissolves into the inhibitor solution. The slightly diluted medium is eventually discharged from the bottom of the dehydrator via the medium discharge pipeline 5.

The discharged medium is re-pressurized with the pump 6. A major portion of the re-pressurized medium passes through the regulation valve 7 and is sent to the primary side of the pre-cooling section 9a of the medium cooler 9 via the medium transfer pipeline 8.

A small fraction of the re-pressured medium is diverted via the effluent transfer pipelines 4 into the inhibitor regenerator 15 wherein the diluted inhibitor solution is re-concentrated. The highly concentrate inhibitor solution is sent via the inhibitor recycle pipeline 16 and mixes with the medium flowing in the medium transfer pipeline 8. The wastewater separated in the regenerator is discharged via the wastewater discharge pipeline 17.

In the medium cooler, the medium is first pre-cooled with the cold lean NG reflux coming from the integrated NG processor via the lean NG outlet pipeline 23. The re-heated lean NG is delivered via the lean NG delivery pipeline 11 to the NG transportation pipeline (not shown).

The pre-cooled medium continues to flow upward into the primary side of the deep-cooler 9b wherein it is deep-cooled to the required low-temperature with the refrigerant (or brine) provided with the industrial refrigerator 90. The refrigerant enters the secondary side of the deep-cooler via the refrigerant inlet pipeline 12 and leaves via the refrigerant outlet pipeline 13. The deep-cooled medium is recycled into the dehydrator via the medium inlet pipeline 3. The makeup medium is introduced via the medium makeup pipeline 10.

In case the concentration of the higher hydrocarbons in NG is so high that the light oil gas partially condenses into liquid in the dehydrator 1a. The mixed condensates of water in the medium and light oil is collected at the bottom of the dehydrator. The light oil layer flowing over the liquid medium is discharged via the light oil outlet 18 as a part of the final product.

Now return to the absorber 1b of the integrated NG processor. The dewpoint of the dehydrated NG when leaving from the top of the dehydrator is close to the entrance temperature of the deep-cooled medium. The cold dehydrated NG enters the absorber from the bottom, and flows upward through a series of bypass pipes 19 in the enriched oil collector 19a. The up-flowing dehydrated NG comes into contact with the down-flowing cold absorbent running through a packed column 20. A steam of the deep-cooled absorbent enters from the top of the absorber via the absorbent inlet pipeline 21. The absorbent is distributed by the absorbent distributor 22. The temperature of the absorbent at the top of the absorber is kept slightly about the dewpoint of the dehydrated NG to avoid gas-hydrate formation.

With such a counter-extraction process in the absorber, the recovery rates of the light oil gases ($C_3$+) are very high. A reasonable fraction of ethane ($C_2$) is also recovered. At the same time, the absorption rate of methane is relatively low. As mentioned above, the lean NG leaves the top of the absorber via the lean NG outlet pipeline 23, and enters the secondary side of the pre-cooler 9a of the medium cooler 9.

The rich oil flows out from the absorber 1b via the rich oil outlet pipeline 24 and enters the secondary side of the pre-cooler 25a. The rich oil absorbs heat from the recycling absorbent flowing in the primary side of the pre-cooler. The rich oil leaves the pre-cooler via the rich oil transfer pipeline 26 and enter the fractional distiller 27 wherein the final product, a gaseous mixture enriched in higher hydrocarbons, is separated from the absorbent. The separated higher hydrocarbons gas mixture is delivered via the product outlet pipeline 28 to a refiner (not shown).

The energy required for the fractional distillation process is provided with a heating medium entering the distiller via the heat medium inlet pipeline 29 and leaving by the heat medium outlet pipeline 30.

The recovered absorbent, leaving the fractional distiller via the absorbent outlet pipeline 31, is re-pressurized with a pump 32. The absorbent enters the primary side of the absorbent cooler 25 via the absorbent recycle pipeline 310.

The recycled absorbent flows upward through the primary side of the absorbent cooler 25. It is first pre-cooled with the cold rich oil flowing in the secondary side of the pre-cooler 25a, and then deep-cooled with the refrigerant flowing in the secondary side of the deep-cooler 25b. The refrigerant enters the secondary side of the absorbent deep-cooling section via the refrigerant inlet pipeline 33 and leaves via the outlet pipeline 34. The refrigerant is provided with the industrial refrigerator 30.

Figure 2:
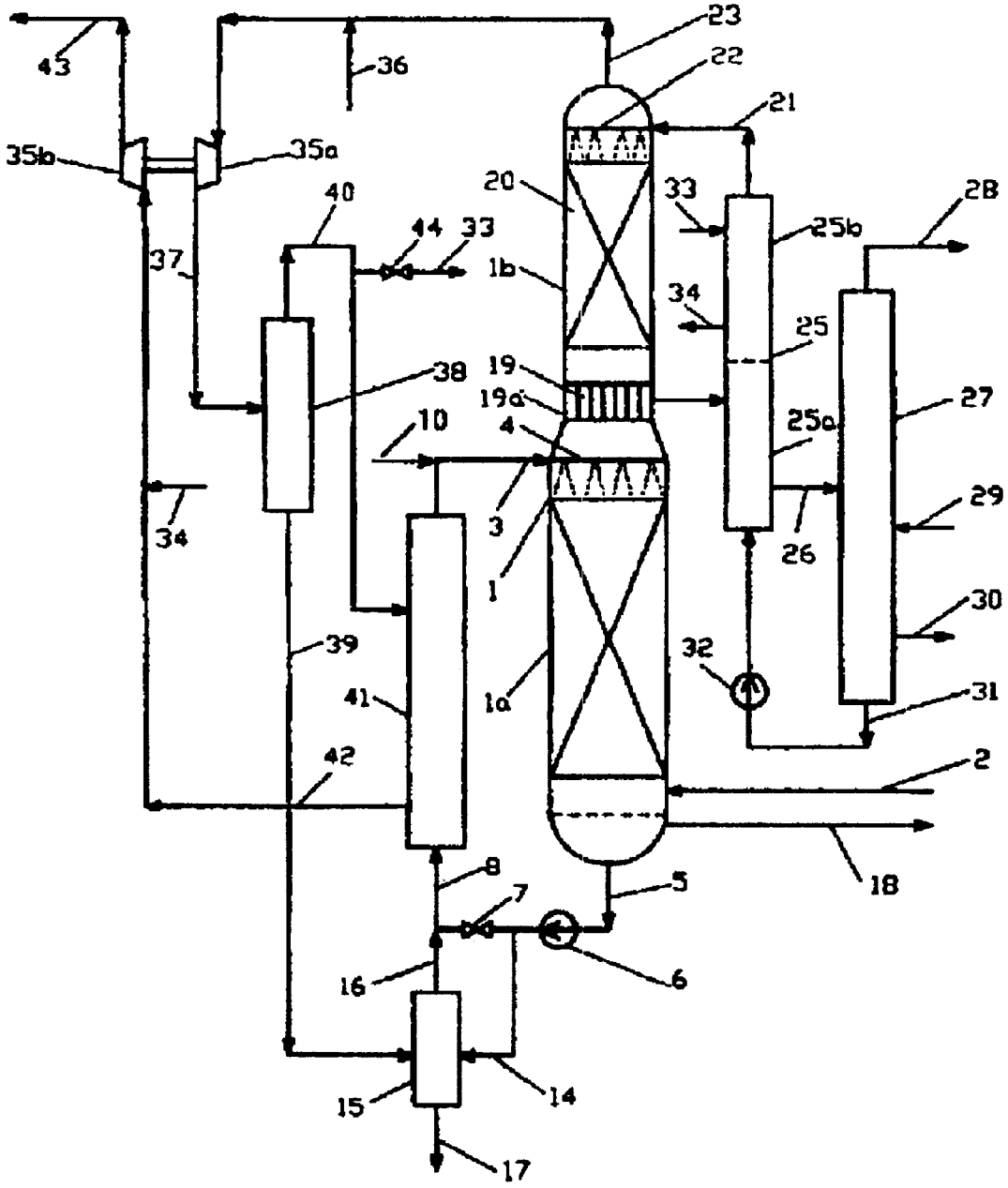
FIG. 2 illustrates another preferred embodiment of the comprehensive NG [processor] *processing* of the present invention wherein an integrated NG expander-compressor is used to provide the required self-refrigeration.

FIG. 2 illustrates another preferred embodiment of the comprehensive NG [processor] *processing* of the present invention, in which an integrated NG expander-compressor is used to provide the required "self-refrigeration". The said embodiment is applicable when the pressure of the lean NG is sufficiently higher than the NG pressure required in the NG transport pipeline. The lean NG may be expanded in three different kinds of gas expansion devices.

Figure 3:
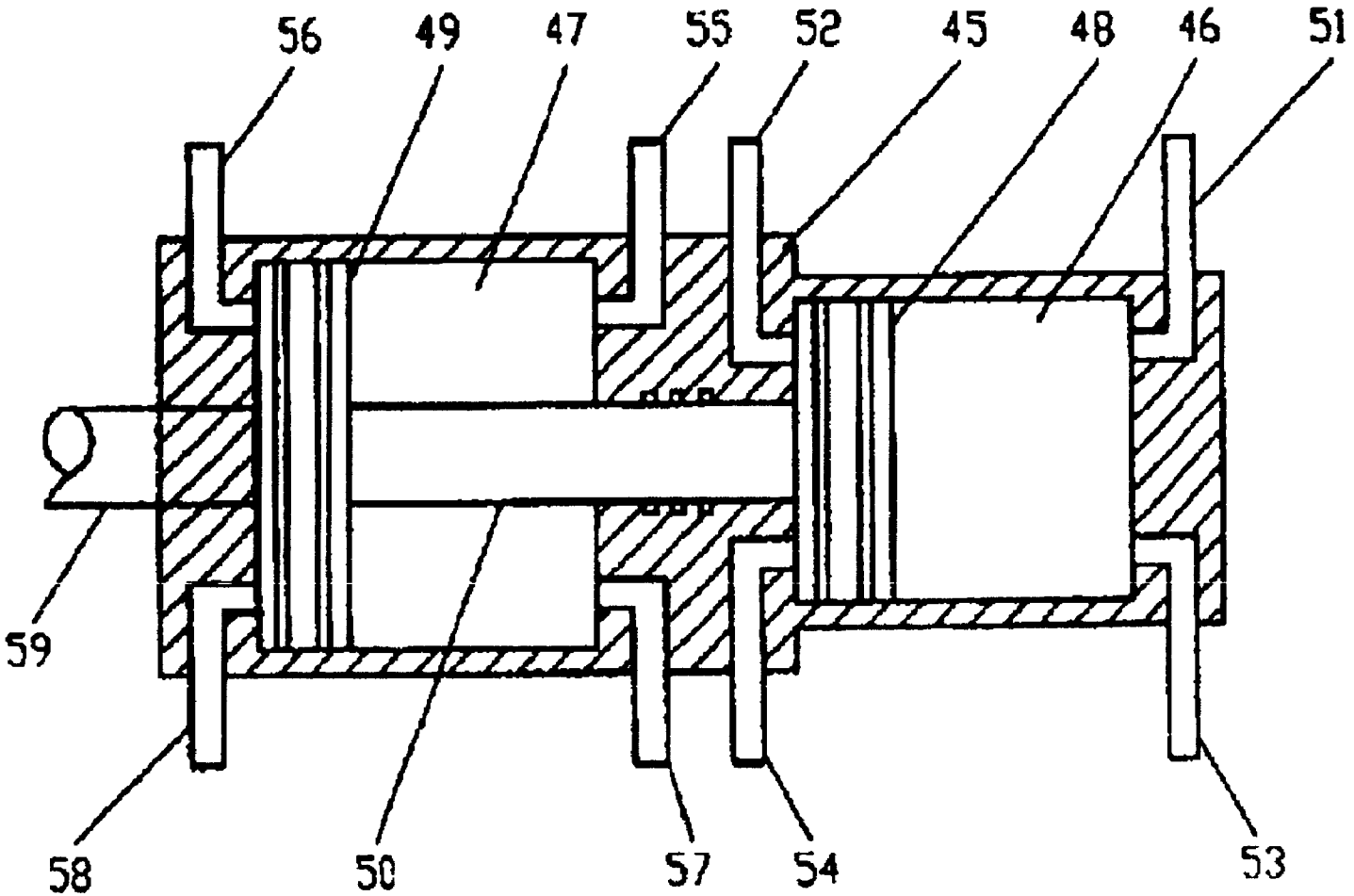
FIG. 3 illustrates the high-efficiency free-piston NG expander-compressor for providing the required self-refrigeration.

According to the magnitudes of the pressure difference between inlet NG and the dehydrated NG transportation pipeline, there are three options for the NG expansion devices. (1) When the said pressure difference is quite large, a simple expansion valve could be used to expand the inlet NG to a pressure above or equal to the transportation pipeline pressure and obtain the desired low temperature for refrigeration. In this case, the de-pressurized NG needs no re-compression. (2) When the said pressure difference is moderately high, the inlet NG has to be expanded below the transportation pipeline pressure to obtain the desired low temperature for refrigeration. A portion of the expansion energy needs to be recovered for re-compression the de-pressurized NG. In this case, a turbo expander-compressor is preferred. (3) When the said pressure difference is rather small, but still relevant, the expansion energy must be recovered to the maximum extent for NG re-compression. In this case, the high efficiency free-piston expander-compressor, as described in the following FIG. 3, is recommended.

It should be noted, for both cases (2) and (3), an external powered NG compressor may also be incorporated, as appropriate, for re-compressing the de-pressurized NG to the required pressure of the NG transport pipeline.

Return to FIG. 2 wherein a turbo NG expander-compressor as mentioned in the case (2) is illustrated as an example.

Because most components of the comprehensive NG processor in FIG. 2 are identical to those in FIG. 1, they are labeled with the same numbers in FIG. 2. Only the dissimilar components of the self-refrigeration unit are labeled with different numbers and will be described in details below. These dissimilar components include the turbo expander 35a and compressor 35b, the medium cooler 41, and the filter 38.

The lean NG, left the absorber 1b via the lean NG outlet pipeline 23 and mixed with the inhibitor introduced via the inhibitor injection pipeline 36, enters the turbo expander 35a and is expanded. Gas expansion causes the NG temperature sharply dropped to the required low temperature. A small amount of the residual moisture is condensed into tinny liquid droplets entrained in the chilly lean NG. The chilly lean NG enters the filter 38 via the de-pressurized NG transfer pipeline 37. The liquid droplets are separated as an effluent, and the latter is discharged into the inhibitor regenerator 15 via the effluent pipeline 39. The dried chilly lean NG enters the secondary side of the medium cooler 41 via the chilly lean NG inlet pipeline 40. The chilly lean NG absorbs the heat from the recycled medium and flows into the compressor 35b via the de-pressurized NG return pipeline 42. A portion of the chilly NG is diverted via the bypass valve 44 and bypass pipeline 33 to the absorbent cooler 25, and returns via the bypass return pipeline 34. The lean NG is then re-compressed to the required pressure and delivered via the lean NG delivery pipeline 43 to the NG transportation pipeline (not shown).

As described above, the system in FIG. 2 does not require any external energy to provide the self-refrigeration.

Having described the features and the advantages of the various embodiments of the present invention as a comprehensive NG processing apparatus, it should be pointed out that the dehydration section with its accessories could also be operated independently as a pure NG dehydrator, without incorporating the absorption section and its accessories.

FIG. 3 illustrates the high-efficiency free-piston NG expander-compressor for self-refrigeration.

The light alloy body 45 of the said free piston expander-compressor comprises two cylinders with different diameters. The smaller cylinder 46 is the expander, and the larger cylinder 47 the compressor. Two free pistons, 48 and 49, are rigidly connected with a short hollow shaft 50 to form a single integrated moving part. Since the latter is a compact, light-weighted component, very high frequency operation and high mechanical efficiency are feasible. For a high-pressure NG, the size of such a free piston machine is relatively small. For example, for an apparatus processing 500,000 $m^3$ STP per day, under an initial pressure of 10 MPA and an exit pressure of 5 MPA, the maximum diameter of the free piston expander-compressor will be in the order of 12 cm when working at 4,000 strokes per minute.

In FIG. 3, the NG inlet pipelines 51 and 52 and the outlet pipelines 53 and 54 of the expander, as well as the inlet pipelines 55 and 56 and the outlet pipelines 57 and 58 of the compressor are connected to the relevant cylinders as illustrated. The associated valves controlling these inlet pipelines and outlet pipelines are similar to those used in modern high-speed internal combustion engine. These valves are not shown in FIG. 3.

In case that the pressure difference between the inlet NG and the outlet NG to the pipeline is too small so that additional external compressing energy is required, a viable option is to connect the said free piston with extending the shaft 59, as shown by the dotted line, to a conventional reciprocating piston-type gas engine, not shown in FIG. 3.

In summary, the present invention is related to an apparatus for efficient and cost-effective comprehensive processing of NG, including the removal of moisture and the recovery of the higher hydrocarbons ($C_2^+$), in a single integrated processing unit. The present invention provides a low-cost comprehensive NG processor that is universally applicable to both terrestrial and off-shore NG exploitation.

Having describes the present invention and preferable embodiments thereof, it will be recognized that numerous variations, substitutions and additions may be made to the present invention by those ordinary skills without departing from the spirit and scope of the appended claims.

What is claimed is:

1. A comprehensive gas processor for removing the moisture and recovering the higher hydrocarbons (i.e., $C_2^+$) therein either on-situ in a gas field or in a plant comprising:

(a) an integrated gas processor comprising two sections working on a hybrid process, i.e., an integration of two different processes within a single casing;

i) a refrigeration-dehydration section working on refrigeration process wherein the inlet gas contacts with a counter-flowing stream of dispersed cold heat-transport medium containing a non- or low-volatile hydrate inhibitor with boiling point higher than 180° C. and the moisture of said gas is condensed and removed with the cold heat-transport medium; and ii) an absorption section working on low-temperature absorption process wherein the dehydrated gas contacts with a counter-flowing stream of dispersed liquid absorbent with a *higher* hydrocarbon gas solubility [higher] *greater* than 20 scf/gal wherein the higher hydrocarbons (i.e., $C_2^+$) are absorbed[.] *under said absorption conditions*;

(b) a heat-transport medium cooler comprising a pre-cooling stage and a deep-cooling stage wherein in said pre-cooling stage said heat-transport medium is pre-cooled with the cold outlet gas left said integrated gas processor and in said deep-cooling stage the medium is deep-cooled with the refrigerant provided with a refrigerator;

(c) an absorbent cooler comprising a pre-cooling stage and a deep-cooling stage wherein in said pre-cooling stage said recycling absorbent is pre-cooled with the cold outlet absorbent left said integrated gas processor and in said deep-cooling stage the absorbent is deep-cooled with the refrigerant provided with a refrigerator;

(d) a fractional distiller for separating the absorbed higher hydrocarbons as a product from the outlet absorbent left said integrated gas processor and then the separated absorbent is recycled back to said integrated gas processor;

(e) an inhibitor regenerator for concentrating the low-volatile hydrate inhibitor to be recycled and discharging the wastewater;

(f) a refrigerator for providing the refrigerant to said deep-cooling stages of said heat-transport medium cooler and said absorbent cooler;

(g) a pipeline for delivering the recovered higher hydrocarbons; and (h) a gas inlet pipeline and a pipeline for delivering the processing gas.

2. A comprehensive gas processor of claim 1 wherein the dehydration section of said integrated processor and its accessories (comprising said heat-transport medium cooler, said inhibitor regenerator, said refrigerator, and said gas inlet-pipeline and a pipeline for delivering the processed gas) are operated independently as a gas dehydrator without incorporating the absorption section.

3. A comprehensive gas processor of claim 1 wherein said heat-transport medium is an aqueous solution of calcium chloride or other ionizing salts [and the regeneration rate of said solution is less than 5 liter per kg of wastewater to be discharged].

4. A comprehensive gas processor of claim 1 wherein said heat-transport medium is an aqueous solution of ethylene glycol or other organic compounds with boiling point[s] higher than 180° C. [and the regeneration rate of said solution is less than 5 liter per kg of wastewater discharged.]

5. A comprehensive gas processor of claim 1 wherein said absorbent is heavy oil (i.e., hydrocarbon mixture with molecular weight higher than 100) or other organic compounds with hydrocarbon gas solubility higher than 20 scf/gal liquid.

6. A comprehensive gas processor of claim 1 when working on inlet gas pressure greater than 5.0 MPa wherein said refrigerant to said deep-cooling stages of said heat-transport medium cooler and said absorbent cooler is provided with a gas expansion device with the inlet gas pressure is greater than 5.0 MPa.

7. A gas expansion device of claim 6 wherein said expansion device is a triple-sectional free-piston gas expander-compressor-booster comprising:

(a) a gas expansion cylinder and a gas compression cylinder;

(b) a co-shaft gas expansion piston and gas compression piston; and (c) a co-shaft gas-fueled booster piston-engine providing supplemental power for compressing said expanded gas to the required delivery pipeline pressure.

*8. A continuous process for separating moisture and hydrocarbons higher than methane from a natural gas stream at pipeline or wellhead pressure, comprising removing said moisture and said hydrocarbons heavier than methane as a $C_2^+$ mixture, including the following steps:*

*(a) Cooling said natural gas stream by directly contacting the natural gas stream with a low temperature counter-flowing heat-transport medium containing an aqueous solution of a gas-hydrate inhibitor at pipeline or well-head pressure and at a rate sufficient to cool said gas to the low temperature required by the absorption Step (c), and the majority of water moisture is condensed and dissolved into the heat-transport medium and, at the same time, a portion of higher hydrocarbons is also condensed as a liquid that is insoluble to the heat transport medium*

*(b) Separating the insoluble condensed higher hydrocarbons liquid from the condensed water (already dissolved into the heat-transport medium) as a portion of the product stream;*

*(c) Extracting said dehydrated, depleted cold natural gas stream leaving Step (a) by flowing counter-flow to the cold natural gas stream a cold absorbent with a higher hydrocarbon (i.e., $C_2^+$) solubility greater than 20 scf/gal under said absorption conditions and at a rate sufficient to produce a rich absorbent stream containing $C_2^+$ mixture and a small portion of methane, and a cold residue natural gas stream of gas transport pipeline quality;*

*(d) Regenerating said rich absorbent by fractionating the rich absorbent leaving Step (c) at reduced pressure and separating from said absorbent the absorbed $C_2^+$ mixture as a product stream;*

*(e) Cooling the heat-transport medium leaving Step (a) to said sufficiently low temperature in two steps: first with the cold stream of the residue gas leaving Step (c), then with the refrigerant provided by an external refrigerator;*

*(f) Separating the condensed water moisture from said heat transport medium by evaporating a small portion of the heat-transport medium leaving Step (a) under reduced pressure, and recycling the concentrated inhibitor solution to the heat-transport medium stream;*

*(g) Recycling the regenerated absorbent leaving Step (d) by compressing it to pipeline or well-head pressure, and cooling it to the required low temperature in two steps: first with the rich absorbent leaving Step (c), then with the refrigerant provided by an external refrigerator; and*

*(h) Delivering the residue gas leaving Step (e) into the gas transport pipeline.*

*9. The process of claim 8, wherein the cold stream of the residue gas leaving Step (c) is expanded to a lower pressure and much lower temperature to provide sufficient internal refrigeration.*

*10. The process of claim 9, wherein in Step (e) the heat-transport medium leaving Step (a) is cooled to said sufficiently low temperature with the cold stream of the said expanded residue gas.*

*11. The process of claim 8, wherein in step (a) the said heat transport medium is an aqueous solution of calcium chloride or other ionizing salts with a potential regeneration rate less than 5 liter per kg of wastewater to be discharged.*

*12. The process of claim 8, wherein in step (a) the said heat transport medium is an aqueous solution of ethylene glycol or other organic compounds with a potential regeneration rate less than 5 liter per kg of wastewater to be discharged.*

* * * * *